United States Patent Office 3,262,982
Patented July 26, 1966

3,262,982
PROCESS FOR PREPARING ARYL ETHANES
Allan S. Hay, Schenectady, N.Y., assignor to General Electric Company, a corporation of New York
No Drawing. Filed Sept. 3, 1963, Ser. No. 306,300
18 Claims. (Cl. 260—668)

This invention relates to a method for producing aryl ethanes. More particularly, it relates to a process of producing aryl ethanes by a process which comprises reacting an aryl methane with a tetra-substituted diphenoquinone in the liquid phase. When the aryl methane is a diaryl methane, the product is a 1,1,2,2-tetraaryl-substituted ethane. When the aryl methane is a fluorene, the aryl ethane product is a 9,9'-bifluorene. The product from the tetra-substituted diphenoquinone is the corresponding tetra-substituted biphenol in both reactions.

Fluorene is readily available as a product occurring naturally in coal tar and diaryl methanes are readily prepared by the reaction of formaldehyde with aryl hydrocarbons in the presence of hydrochloric acid. However, to prepare the corresponding tetraaryl-substituted ethane or 9,9'-bifluorene derivatives one must first halogenate the methylene group and then couple the product by removal of the halogen with an alkali metal. Such a two-step process is not only time-consuming but relatively expensive to carry out. Generally, when fluorenes or diaryl methanes are oxidized with oxidizing agents, they form the corresponding ketones, e.g., fluorenones from fluorene and diaryl ketones from diaryl methanes.

In my copending applications, Serial No. 212,127 and Serial No. 212,128, filed July 24, 1962, and assigned to the same assignee as the present invention, which latter application is a continuation-in-part of my applications Serial No. 69,245, filed November 5, 1960, and Serial No. 744,086, filed June 24, 1958, both of which are now abandoned, I have disclosed and claimed a facile method for making 3,3',5,5'-tetra-substituted diphenoquinones by reacting 2,6-disubstituted phenols with oxygen using as the oxygen-carrying intermediate a solution of an amine-basic cupric salt complex in which the phenol is soluble. In my copending applications, Serial No. 239,316, filed November 21, 1962, now U.S. 3,210,384, issued October 5, 1965, as a continuation-in-part of application Serial No. 117,837, filed July 19, 1961, and now abandoned, both assigned to the same assignee as the present invention, I have disclosed and claimed a method for making 3,3',5,5'-tetra-substituted diphenoquinones by reacting oxygen with 2,6-disubstituted phenols using as the oxygen-carrying intermediate a complex of a basic cupric salt with nitriles or tertiary amides. I have now discovered that 3,3',5,5'-tetra-substituted diphenoquinones will react with aryl methanes whereby 2 moles of the aryl methane are coupled together with the diphenoquinone being reduced to a biphenol. The biphenol is readily separable from the tetraaryl ethanes and bifluorenes and may be recovered as such or it may readily be reoxidized with oxygen to the diphenoquinones so that it may be reused in the process. If recovered, the biphenols are particularly useful as the hydroxy reactant in the making of resins, e.g., polyesters, polycarbonates, epoxy resins, etc. If the biphenol is reoxidized back to the diphenoquinone, the net overall reaction is the coupling of aryl methanes with oxygen using the diphenoquinone as the oxygen-carrying intermediate. Such a process allows tetraaryl ethanes and bifluorenes and the biphenols, if desired, to be produced in high yields and at low cost.

The aryl methanes which may be used as starting materials are the diaryl methanes having the general formula

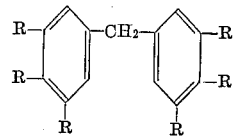

and fluorenes having the general formula

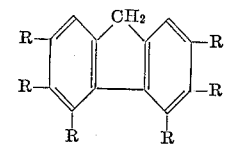

where each R is the same or different monovalent substituent selected from the group consisting of hydrogen, halogen, methoxy and phenyl. These aryl methanes are reacted in the liquid phase with a 3,3',5,5'-tetra-substituted diphenoquinone having the general formula

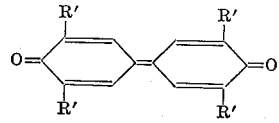

where each R' is the same or different monovalent radical selected from the group consisting of alkyl, alkoxy, aryl, and aryloxy radicals. Typical examples of the alkyl, alkoxy, aryl and aryloxy radicals which R' may be, include any of the above radicals having any number of carbon atoms since these substituents do not enter into, interfere with, or have any influence on the reaction of the diaryl methane with the diphenoquinone. They may include, for example, from 1 to 40 or more carbon atoms and the alkyl and alkoxy radicals may include primary, secondary, and tertiary alkyl groups and cycloalkyl groups. Since the most readily available diphenoquinones and the substituted phenols for preparing such diphenoquinones are those having substituents having from 1 to 8 carbon atoms, they are preferred, but the invention is not limited thereto. Typical examples of alkyl, alkoxy, aryl and aryloxy radicals are, for example, methyl, methoxy, ethyl, ethoxy, propyl, propoxy, isopropyl, isopropoxy, the isomeric butyl and butoxy radicals, i.e., n-butyl, n-butoxy, isobutyl, isobutoxy, cyclobutyl, cyclobutoxy, t-butyl, t-butoxy, etc., the isomeric amyl radicals, the isomeric amyloxy radicals, the isomeric hexyl radicals, the isomeric hexyloxy radicals, the isomeric decyl radicals, the isomeric decyloxy radicals, the isomeric hexadecyl radicals, the isomeric hexadecyloxy radicals, the isomeric eicosyl radicals, the isomeric eicosyloxy radicals, the isomeric tricosyl radicals, the isomeric tricosyloxy radicals, the isomeric triacontyl radicals, the isomeric triacontyloxy radicals, etc. The alkyl radicals may be substituted with aryl or cycloalkyl radicals, for example, benzyl, phenylethyl, cyclohexylethyl, naphthylethyl, etc. Examples of aryl and aryloxy radicals are phenyl, phenoxy, tolyl, toloxy, xylyl, xyloxy, naphthyl, naphthyloxy, methylnaphthyl, methylnaphthyloxy, ethylphenyl, ethylphenoxy, cyclohexylphenyl, cyclohexylphenoxy, etc. Because the diphenoquinones in which the R' substituents are either a lower alkyl group, i.e., from 1 to 8 carbon atoms, or phenyl, are most readily available or easily made, they are the preferred substituents.

Examples of diaryl methanes and fluorenes which I may use as starting materials are Diphenylmethane (benzylbenzene),
3-chlorobenzylbenzene,
4-chlorobenzylbenzene,
3,4-dichlorobenzylbenzene,
3,5-dichlorobenzylbenzene,
3-bromo-4-chlorobenzylbenzene,
3,4,5-trichloro-benzylbenzene,
Bis(3-chlorophenyl)methane,
Bis(4-chlorophenyl)methane,
Bis(3,5-dichlorophenyl)methane,
Bis(3,4,5-trichlorophenyl)methane,
2-bromobenzylbenzene,
4-iodobenzylbenzene,
3-phenylbenzylbenzene,
4-methoxybenzylbenzene,
3-chloro-4-methoxybenzylbenzene,
Bis(3-bromo-4-methoxyphenyl)methane,
Fluorene,
2-chlorofluorene,
2,7-dichlorofluorene,
3-methoxyfluorene,
4-phenylfluorene,
2-chloro-3-methoxy-4-phenylfluorene,
4,5-diphenylfluorene, etc.

Examples of diphenoquinones having R' substituents noted above that I may use are 3,3',5,5'-tetramethyldiphenoquinone,
3,3',5,5'-tetramethoxydiphenoquinone,
3,3',5,5'-tetrabutyldiphenoquinone (where the butyl groups are primary, secondary or tertiary butyl groups),
3,3',5,5'-tetracyclohexyldiphenoquinone,
3,3',5,5'-tetraphenyldiphenoquinone,
3,3',5,5'-tetraphenoxydiphenoquinone,
3,3'-dimethyl-5,5'-diphenyldiphenoquinone,
3,3',5,5'-tetrabenzyldiphenoquinone,
3,3',5,5'-tetratolyldiphenoquinone,
3,3',5,5'-tetradecydiphenoquinone,
3,3',5,5'-tetraeicosyldiphenoquinone,
3,3'-dimethyl-5,5'-dibutyldiphenoquinone,
3,3'-dimethyl-5,5'-diphenyldiphenoquinone,
3,3'-di-t-butyl-5,5'-diphenyldiphenoquinone, etc.

The reaction between the aryl methane and the diphenoquinone occurs very readily in the liquid phase. The liquid phase may be provided by either using an excess of the aryl methane and using a temperature where the aryl methane is liquid, or a solvent which is inert under reaction conditions may be used, for example, hydrocarbons, halogenated hydrocarbons, examples of which are benzene, toluene, tetrachloroethane, the chlorinated benzenes, the chlorinated toluenes, etc., aromatic heterocyclic amines, e.g., pyridine, lutidine, etc. Since the diphenoquinones are usually relatively insoluble at room temperature in most solvents, the reaction is speeded by heating the solution in order to increase the solubility of the diphenoquinone and thereby hasten the reaction. As is well known, the speed of reaction is usually doubled for every 10°-rise in temperature. I prefer to hasten the reaction between the aryl methane and the diphenoquinone by heating the reaction mixture, although the reaction will proceed at a very slow rate even at ambient temperatures. This slow rate is occassioned by both the low solubility of the diphenoquinone as well as the slower reaction because of the lower temperature. Therefore, I prefer to heat the liquid phase to a temperature of at least 100° C. up to the decomposition temperature of any of the reactants or the products. Ambient atmospheric pressure can be used or pressures lower or higher than ambient pressure conditions can be used. However, there is no advantage to using less than the ambient pressure conditions. Higher than ambient pressure conditions are usually used if temperatures higher than the boiling point at atmospheric conditions of the reaction mixture are being used. However, by proper choice of the solvent to form the liquid phase, desired temperatures can be reached within the range of from 100° C. up to the reflux temperature of the reaction mixture at ambient atmospheric conditions. As will be explained later, where ease of isolation of the substituted ethanes and the biphenol product is desired, equivalent amounts of the aryl methane and diphenoquinone (i.e., 2 moles of the aryl methane to 1 mole of diphenoquinone) are used in a solvent, preferably one in which both the aryl methane and diphenoquinone and the aryl ethane and biphenol products are soluble at the temperature of the reaction.

The reaction between the aryl methane and the diphenoquinone may, if desired, also be hastened by use of catalysts, but such use is not necessary. Acidic materials are good catalysts, but they must be soluble in the reaction mixture and non-reactive with the reactants and products. Typical acid catalysts are the carboxyl-substituted hydrocarbons and carboxyl-substituted halohydrocarbons, examples of which are acetic acid, propionic acid, butyric acid, mono-, di- and trichloroacetic acid, mono-, di- and tribromoacetic acid, mono-, di- and trifluoroacetic acid, benzoic acid, chlorobenzoic acid, etc. Since it is the carboxyl group which is the active catalyst for the reaction, the balance of the molecule of the carboxylic acid is not an important part of the molecule, catalytic activity being strongly due to the acidity of the acid. Therefore, greatest catalytic activity is obtained with the strongest acids. Mineral acids either react with the diphenoquinone or are insoluble in the reaction mixture, so that they provide little catalytic activity. Partial esters of mineral acids, e.g., mono- and dialkyl esters of phosphoric acid, however, can be used.

Since the diphenoquinones are highly colored compounds whereas the aryl ethanes and biphenol products are colorless when pure, progress of the reaction is very readily followed by the disappearance of the color caused by the diphenoquinone. Some slight amount of color may remain due to some small amount of by-product formation, but this is readily distinguished from the color due to the diphenoquinone. In order to obtain a maximum yield, it is desirable to continue the reaction until the color caused by the diphenoquinone disappears.

In the reaction between the aryl methane and the diphenoquinone, 2 molecules of the aryl methane are coupled together to the methane group for each molecule of diphenoquinone that is reduced with corresponding biphenol. The reactions involved upon oxidation of the aryl methane to the corresponding aryl ethane and a reduction of the diphenoquinone to the corresponding biphenol are illustrated by the following equations where R and R' are as previously defined for the aryl methane and diphenoquinone:

When aryl methane is a diaryl methane

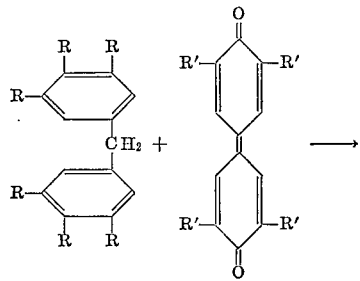

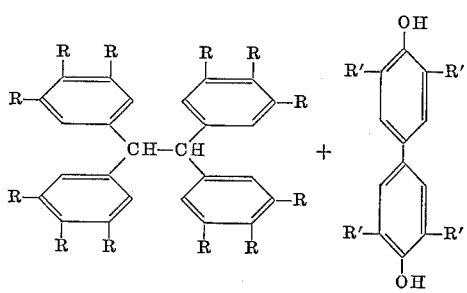

When aryl methane is a fluorene

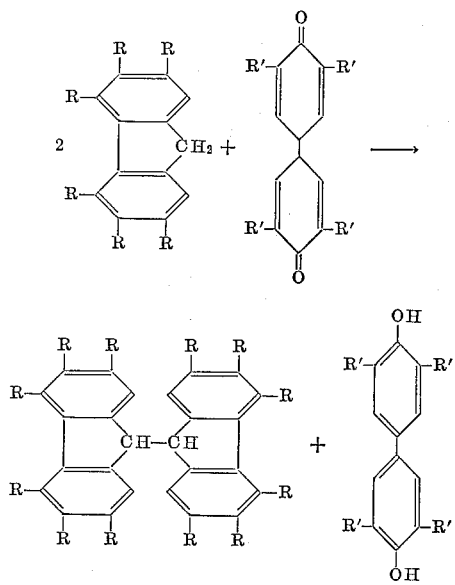

If more than the stoichiometric amount of diphenoquinone is used, further oxidation of the aryl ethanes occurs leading to products which are as yet unidentified. The amount of further oxidation is directly proportional to the amount of diphenoquinone in excess of the stoichiometric amount. Therefore, it is preferable to use at least 2 moles of the aryl methane for each mole of diphenoquinone. Greater amounts of the diaryl methane can be used, for example, as the solvent, and to insure complete utilization of the diphenoquinone.

More than one diaryl methane and also more than one diphenoquinone may be used if a mixture of products is desired. Such a mixture can be used per se or separated into its individual constituents by such techniques as fractional distillation, crystallization, precipitation, etc., in the same manner as the aryl ethane product is separated from the biphenol product. On the other hand, where it is desirable only to produce aryl ethanes, the aryl ethane may be separated from the reaction mixture and the biphenol re-oxidized to the diphenoquinone which is then used to oxidize more of the aryl methane so that the net result of the reaction is the oxidation of aryl methanes to aryl ethanes in which the only reactants consumed are the aryl methane and oxygen, with the diphenoquinone merely serving as an oxygen-carrying intermediate which is recycled in the process.

In order that those skilled in the art may better understand my invention, the following examples are given which are illustrative of the practice of my invention and are not intended for purposes of limitation. In all the examples, all percentages are by weight unless stated otherwise.

Example 1

A mixture of 40 ml. of diphenylmethane and 5 grams of 3,3',5,5'-tetra-t-butyldiphenoquinone was heated in a reaction vessel equipped with an air condenser for a period of 1 hour to a temperature of 261° C. which was the reflux temperature of the reaction mixture. The initially red solution had become a pale yellow color by this time. On cooling the solution, a precipitate of 1,1,2,2-tetraphenylethane formed, and was filtered from the balance of the reaction mixture. After recrystallization from an ethanol-chloroform mixture a yield of 2.6 grams of the 1,1,2,2-tetraphenylethane (65% yield based on the diphenoquinone) was obtained having a melting point of 208° C., agreeing with the reported melting point of 209° C. A carbon and hydrogen analysis showed 92.9% carbon and 6.6% hydrogen, compared to a theoretical of 93.37% carbon and 6.63% hydrogen for 1,1,2,2-tetraphenylethane.

The 2,2',6,6'-tetra-t-butylbiphenol was reoxidized back to 3,3',5,5'-tetra-t-butyldiphenoquinone by dissolving 1 gram of cuprous chloride, 1.2 grams of N,N,N',N'-tetramethylethylenediamine, and 125 ml. of isopropanol in the reaction mixture from which the 1,1,2,2-tetraphenylethane product had been removed. Oxygen was passed through the vigorously stirred solution at room temperature which caused the diphenoquinone to start precipitating almost immediately from the solution. The passage of oxygen was continued for approximately 1 hour, after which the red-brown precipitate was filtered, washed and dried. A total of 2.7 grams of 3,3',5,5'-tetra-t-butyldiphenoquinone was recovered from the solution having a melting point of 240–242° C. Recrystallization raised its melting point to the reported melting point of 245° C. for this diphenoquinone.

Example 2

A mixture of 2 grams of 3,3',5,5'-tetraphenyldiphenoquinone and 5 grams of diphenylmethane was heated up to the boiling point of the reaction mixture by which time the deep red color had become pale yellow, indicating that the reaction was complete. The reaction mixture was cooled and diluted with 50 ml. of ethanol, which gave a precipitate of 1.22 grams (90% yield) of 1,1,2,2-tetraphenylethane having a melting point of 211° C., which agrees well with the melting point of this compound. After concentration of the filtrate and cooling, the 2,2',6,6'-tetraphenyl-p,p'-biphenol product was recovered as light pink crystals having a melting point of 165–6° C. Recrystallization raised the melting point to 185–6° C. A second recrystallization raised the melting point to 196° C., which showed no depression in melting point when mixed with the 2,2',6,6'-tetraphenyl-p,p'-biphenol prepared by the method disclosed and claimed in my copending application Serial No. 306,301, filed concurrently herewith and assigned to the same assignee as the present invention, which discloses and claims this compound.

Example 3

Over a 15-minute period, 10 grams of 3,3',5,5'-tetramethyldiphenoquinone were added to 75 ml. of diphenyl methane, which was heated to its reflux temperature of 261° C. The color of the diphenoquinone disappeared as rapidly as the diphenoquinone was added. The reaction mixture was cooled and diluted with an equal volume of ethanol which precipitated 6.5 grams of 1,1,2,2-tetraphenylethane, identified by its melting point and mixed melting point as in Example 1.

Example 4

A mixture of 4.08 grams of 3,3',5,5'-tetra-t-butyldiphenoquinone and 3.32 grams of fluorene was placed in a glass tube which was then flushed with nitrogen and sealed. The sealed tube was heated at a temperature of from 250° to 300° C. for 1 hour during which time the reaction mixture became almost colorless. The reaction mixture was removed from the tube and triturated with methanol, leaving behind as a precipitate 1.8 grams (50.4% yield) of colorless 9,9'-bifluorene having a melting point point of 246° C., which agreed with that reported in the literature for this compound. A carbon and hydrogen analysis showed that the product had 93.8% carbon and 5.2% hydrogen, compared with a theoretical of 94.51% carbon and 5.49% hydrogen for 9,9'-bifluorene.

In a similar way, 9,9'-bifluorene is prepared by oxidizing fluorene by substituting 4.88 grams of 3,3',5,5'-tetraphenyldiphenoquinone and also by substituting 2.40 grams of 3,3',5,5'-tetramethyldiphenoquinone for the 4.08 grams of 3,3',5,5'-tetra-t-butyldiphenoquinone.

Likewise, other aryl ethanes may be prepared by substituting an equivalent amount of the various disclosed diaryl methanes and fluorenes disclosed above for the diphenylmethane and the fluorene in the above examples.

The aryl ethanes produced by my process have a wide variety of uses as chemical intermediates in the preparation of a wide variety of materials. For example, they may be dehydrogenated to produce the corresponding aryl ethenes which can be polymerized either alone or with other polymerizable monomers to yield a wide variety of useful copolymers. Likewise, the aryl ethanes may be nitrated and diazotized to produce interesting and useful dyes.

The biphenols as have been disclosed may be reoxidized back to the diphenoquinone or they may be recovered from the reaction mixture and used as the dihydroxy component in the making of useful resins such as polyesters, polycarbonates, epoxy resins, etc.

Obviously, other modifications and variations of the present invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. The process of producing an aryl ethane which comprises reacting in the liquid phase (1) an aryl methane selected from the group consisting of compounds having the following general formulas

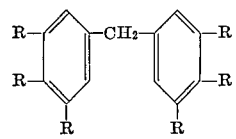

and

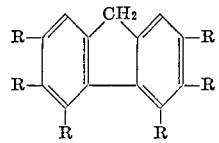

where R is a monovalent substituent selected from the group consisting of hydrogen, halogen, methoxy and phenyl with (2) a 3,3',5,5'-tetrasubstituted diphenoquinone whose substituents are monovalent radicals selected from the group consisting of alkyl, alkoxy, aryl and aryloxy radicals.

2. The process of claim 1 wherein said reaction is promoted by heating the liquid phase for a period of time sufficient to cause the disappearance of the color caused by the diphenoquinone.

3. The process of claim 1 wherein the aryl methane is diphenyl methane.

4. The process of claim 1 wherein the aryl methane is diphenyl methane and the reaction is promoted by heating the liquid phase for a period of time sufficient to cause the disappearance of the color caused by the diphenoquinone.

5. The process of claim 1 wherein the aryl methane is fluorene.

6. The process of claim 1 wherein the aryl methane is fluorene and the reaction is promoted by heating the liquid phase for a period of time sufficient to cause the disappearance of the color caused by the diphenoquinone.

7. The process of claim 1 wherein the diphenoquinone is 3,3',5,5'-tetramethyldiphenoquinone.

8. The process of claim 1 wherein the diphenoquinone is 3,3',5,5'-tetramethyldiphenoquinone and the reaction is promoted by heating the liquid phase for a period of time sufficient to cause the disappearance of the color caused by the diphenoquinone.

9. The process of claim 1 wherein the diphenoquinone is 3,3',5,5'-tetra-t-butyldiphenoquinone.

10. The process of claim 1 wherein the diphenoquinone is 3,3',5,5'-tetra-t-butyldiphenoquinone and the reaction is promoted by heating the liquid phase for a period of time sufficient to cause the disappearance of the color caused by the diphenoquinone.

11. The process of claim 1 wherein the diphenoquinone is 3,3',5,5'-tetraphenyldiphenoquinone.

12. The process of claim 1 wherein the diphenoquinone is 3,3',5,5'-tetraphenyldiphenoquinone and the reaction is promoted by heating the liquid phase for a period of time sufficient to cause the disappearance of the color caused by the diphenoquinone.

13. The process of producing 1,1',2,2'-tetraphenyl ethane which comprises reacting in the liquid phase (1) diphenyl methane, and (2) 3,3',5,5'-tetramethyldiphenoquinone, said reaction being promoted by heating the liquid phase for a period of time sufficient to cause the disappearance of the color caused by the diphenoquinone.

14. The process of producing 9,9'-bifluorene which comprises reacting in the liquid phase (1) fluorene with (2) 3,3',5,5'-tetramethyldiphenoquinone, said reaction being promoted by heating the liquid phase for a period of time sufficient to cause the disappearance of the color caused by the diphenoquinone.

15. The process of producing 1,1',2,2'-tetraphenyl ethane which comprises reacting in the liquid phase (1) diphenyl methane, and (2) 3,3',5,5'-tetra-t-butyldiphenoquinone, said reaction being promoted by heating the liquid phase for a period of time sufficient to cause the disappearance of the color caused by the diphenoquinone.

16. The process of producing 9,9'-bifluorene which comprises reacting in the liquid phase (1) fluorene with (2) 3,3,5,5'-tetra-t-butyldiphenoquinone, said reaction being promoted by heating the liquid phase for a period of time sufficient to cause the disappearance of the color caused by the diphenoquinone.

17. The process of producing 1,1',2,2'-tetraphenyl ethane which comprises reacting in the liquid phase (1) diphenyl methane, and (2) 3,3',5,5'-tetraphenyldiphenoquinone, said reaction being promoted by heating the liquid phase for a period of time sufficient to cause the disappearance of the color caused by the diphenoquinone.

18. The process of producing 9,9'-bifluorene which comprises reacting in the liquid phase (1) fluorene with (2) 3,3',5,5'-tetraphenyldiphenoquinone, said reaction being promoted by heating the liquid phase for a period of time sufficient to cause the disappearance of the color caused by the diphenoquinone.

References Cited by the Examiner

UNITED STATES PATENTS

| | | | |
|---|---|---|---|
| 2,578,479 | 12/1951 | Jennings et al. | 260—668 X |
| 2,872,367 | 2/1959 | Haynes et al. | 260—668 X |

DELBERT E. GANTZ, *Primary Examiner.*

C. R. DAVIS, *Assistant Examiner.*